US009052710B1

(12) United States Patent
Farwell

(10) Patent No.: US 9,052,710 B1
(45) Date of Patent: Jun. 9, 2015

(54) MANIPULATION CONTROL BASED UPON MIMIC OF HUMAN GESTURES

(75) Inventor: Mark L. Farwell, Colorado Springs, CO (US)

(73) Assignee: Exelis Inc., McLean, VA (US)

( * ) Notice: Subject to any disclaimer, the term of this patent is extended or adjusted under 35 U.S.C. 154(b) by 1171 days.

(21) Appl. No.: 12/547,793

(22) Filed: Aug. 26, 2009

Related U.S. Application Data

(60) Provisional application No. 61/161,846, filed on Mar. 20, 2009.

(51) Int. Cl.
  G05B 19/00 (2006.01)
  G05B 19/423 (2006.01)
  B25J 9/16 (2006.01)

(52) U.S. Cl.
  CPC .............. *G05B 19/423* (2013.01); *B25J 9/1656* (2013.01)

(58) Field of Classification Search
  None
  See application file for complete search history.

(56) References Cited

U.S. PATENT DOCUMENTS

| | | | | |
|---|---|---|---|---|
| 4,484,120 A | * | 11/1984 | Olex et al. | 318/568.14 |
| 4,616,326 A | * | 10/1986 | Meier et al. | 700/258 |
| 4,675,502 A | * | 6/1987 | Haefner et al. | 219/124.34 |
| 5,373,747 A | * | 12/1994 | Ogawa et al. | 73/862.581 |
| 5,447,403 A | * | 9/1995 | Engler, Jr. | 414/4 |
| 5,501,498 A | * | 3/1996 | Ulrich | 294/106 |
| 5,579,444 A | * | 11/1996 | Dalziel et al. | 700/259 |
| 5,617,515 A | * | 4/1997 | MacLaren et al. | 700/264 |
| 5,745,387 A | * | 4/1998 | Corby et al. | 703/1 |
| 5,748,854 A | * | 5/1998 | Watanabe et al. | 700/258 |

(Continued)

FOREIGN PATENT DOCUMENTS

JP  2005257343 A  *  9/2005  ................ G01L 5/00

OTHER PUBLICATIONS

J. Kofman, X. Wu, T. Luu, and S. Verma, "Teleoperation of a Robot Manipulator Using a Vision-Based Human-Robot Interface" in IEEE Transactions on Industrial Electronics, vol. 52, No. 5, Oct. 2005, pp. 1206-1219.*

(Continued)

*Primary Examiner* — Jonathan L Sample
(74) *Attorney, Agent, or Firm* — Edell, Shapiro & Finnan LLC

(57) ABSTRACT

A human gesture tracking system includes a sensor device with at least one sensor unit, where the sensor unit is configured to measure at least one of position in three dimensions of a portion of an operator's limb and orientation in three dimensions of the portion of the operator's limb, a processor configured to receive information from the sensor device so as to determine orientation and position displacement in six degrees of freedom of the operator's limb, and an activator that is coupled to communicate with the processor and is further actuated by the operator to designate a start time and an end time in which position and orientation displacements of the portion of the operator's limb are determined by the processor. During system operation, the processor determines position and orientation displacements of the portion of the operator's limb in tracking sessions, each tracking session is defined as a time period between the start time and the end time as designated by the activator. The processor further determines an initial position and orientation of the portion of the operator's limb at the start time of each tracking session and determines position and orientation displacements of the portion of the operator's limb during each tracking session in relation to the initial position and orientation for the tracking session.

22 Claims, 7 Drawing Sheets

(56) References Cited

U.S. PATENT DOCUMENTS

| | | | |
|---|---|---|---|
| 5,762,390 A * | 6/1998 | Gosselin et al. | 294/106 |
| 5,782,401 A * | 7/1998 | Hinrichs | 228/102 |
| 5,845,050 A * | 12/1998 | Sekiguchi | 706/20 |
| 6,272,396 B1 * | 8/2001 | Taitler | 700/245 |
| 6,418,823 B1 * | 7/2002 | Taitler | 83/36 |
| 6,493,606 B2 * | 12/2002 | Saijo et al. | 700/245 |
| 6,496,756 B1 * | 12/2002 | Nishizawa et al. | 700/264 |
| 6,515,669 B1 * | 2/2003 | Mohri | 345/474 |
| 6,584,377 B2 * | 6/2003 | Saijo et al. | 700/245 |
| 6,681,031 B2 * | 1/2004 | Cohen et al. | 382/103 |
| 6,996,456 B2 * | 2/2006 | Cordell et al. | 700/258 |
| 7,129,927 B2 | 10/2006 | Mattsson | |
| 7,466,303 B2 | 12/2008 | Yi et al. | |
| 7,565,295 B1 * | 7/2009 | Hernandez-Rebollar | 704/271 |
| 7,701,202 B2 * | 4/2010 | Torres-Jara | 324/207.2 |
| 7,714,895 B2 * | 5/2010 | Pretlove et al. | 348/211.2 |
| 7,843,425 B2 * | 11/2010 | Lu et al. | 345/156 |
| 7,848,850 B2 * | 12/2010 | Hoshino et al. | 700/264 |
| 8,140,188 B2 * | 3/2012 | Takemitsu et al. | 700/245 |
| 2001/0014781 A1 * | 8/2001 | Nissim | 601/133 |
| 2002/0061504 A1 * | 5/2002 | Saijo et al. | 434/268 |
| 2003/0146898 A1 * | 8/2003 | Kawasaki et al. | 345/156 |
| 2004/0078114 A1 * | 4/2004 | Cordell et al. | 700/258 |
| 2004/0189675 A1 * | 9/2004 | Pretlove et al. | 345/633 |
| 2005/0001842 A1 * | 1/2005 | Park et al. | 345/474 |
| 2005/0065657 A1 * | 3/2005 | Green | 700/245 |
| 2005/0203382 A1 * | 9/2005 | Govari et al. | 600/424 |
| 2005/0218679 A1 * | 10/2005 | Yokoyama et al. | 294/99.1 |
| 2005/0256611 A1 * | 11/2005 | Pretlove et al. | 700/264 |
| 2006/0012197 A1 * | 1/2006 | Anderson et al. | 294/106 |
| 2006/0056678 A1 * | 3/2006 | Tanaka et al. | 382/153 |
| 2006/0253223 A1 * | 11/2006 | Bodenheimer et al. | 700/245 |
| 2007/0018470 A1 * | 1/2007 | Hayakawa et al. | 294/106 |
| 2007/0067678 A1 * | 3/2007 | Hosek et al. | 714/25 |
| 2007/0260394 A1 * | 11/2007 | Dean | 701/207 |
| 2007/0280006 A1 * | 12/2007 | Aoyama et al. | 365/189.01 |
| 2008/0027582 A1 * | 1/2008 | Obinata et al. | 700/260 |
| 2008/0167662 A1 * | 7/2008 | Kurtz | 606/130 |
| 2008/0167818 A1 | 7/2008 | Kimber et al. | |
| 2008/0192005 A1 | 8/2008 | Elgoyhen et al. | |
| 2009/0076657 A1 * | 3/2009 | Tsuboi et al. | 700/275 |
| 2009/0132088 A1 * | 5/2009 | Taitler | 700/264 |
| 2009/0210090 A1 * | 8/2009 | Takemitsu et al. | 700/245 |
| 2011/0015785 A1 * | 1/2011 | Tsusaka et al. | 700/254 |
| 2011/0015787 A1 * | 1/2011 | Tsusaka | 700/264 |

OTHER PUBLICATIONS

S. Ghobadi, O. Loepprich, F. Ahmadov, J. Bernshausen, K. Hartmann, and O. Loffeld, "Real Time Hand Based Robot Control Using Multimodal Images" in IAENG International Journal of Computer Science, 35:4, IJCS_35_4_08, Nov. 20, 2008.*

* cited by examiner

MANIPULATION CONTROL BASED UPON MIMIC OF HUMAN GESTURES

CROSS-REFERENCE TO RELATED APPLICATION

This application claims priority from U.S. Provisional Patent Application Ser. No. 61/161,846, entitled "Robotic Manipulator Control Via Mimic of Human Gestures" and filed Mar. 20, 2009. The disclosure of the above-identified patent application is incorporated herein by reference in its entirety.

BACKGROUND

In human interface devices, in which a user manipulates a robotic device or provides some form of manipulation within a computer controlled system (e.g., a virtual reality scenario controlled by a computer or processor control system), it is very desirable to be able to sufficiently track the position and orientation of a user's movements or gestures in order to effect precise control of the robotic device or within the computer controlled system.

Robotic manipulators, commonly referred to as "robotic arms", are one type of device in which a human interface device can be employed to facilitate movement and control of the manipulator. Robotic manipulators are typically composed of two or more generally linear links connected by joints. Typically, spatial motion of the robotic manipulators is enabled by manipulation of the joints. In other embodiments, links can be elongated and shortened in a telescopic manner to enable motion of the manipulator. In many applications, manipulator motion is performed to change the position and/or orientation of a device located at a terminal end of the manipulator. The device at the terminal end of the manipulator is typically referred to as an end-effector and can be a grasping tool that emulates the action of a human hand or some other gripping mechanism to facilitate grasping and handling of objects. Alternatively, the end-effector can be some other form of tool that does not facilitate grasping, such as a sledge or a hammer, a cutting device, a wrench or screwdriver, etc.

Motion of the end-effector with respect to a predefined base point of the robotic manipulator is controlled by motors that control joint rotation and/or elongation. For each given set of joint positions there is one unique position and orientation of the end-effector relative to the predefined base point of the manipulator, and for a given end-effector position and orientation there are typically multiple combinations of joint positions relative to each other and the base point that will achieve this given end-effector position and orientation. Such joint positioning to achieve the desired position and orientation of the end-effector is referred to as the kinematics of the robotic manipulator.

Control of the robotic manipulator can be achieved in a number of ways. For example, manipulator control can be autonomous, where the robot uses sensor input and logic to determine the motion of the links and joints without human intervention. Another type of manipulator control, commonly referred to as "Teach & Play", involves the recording of precise settings of joint control and then playback of the settings to achieve desired specific and repetitive actions for the manipulator (e.g., useful in assembly line applications).

However, many applications in which manipulators are used require real-time control over the manipulator by a human operator. For these types of applications, the operator typically manipulates a human interface that causes each of the joints to move individually or together in some manner resulting in navigation of the end-effector from an initial position to a final position. However, these types of direct control are often non-intuitive and require training by the operator to master control of the manipulator.

One common method for implementing remote control in a manipulator is to incorporate a human interface that allows the operator to select a joint of the manipulator and then control a motor that moves the joint in a selected direction. Another joint can then be selected by the operator, with motor control being selected by the operator to effect movement of that joint. The process of selecting and moving different joints is repeated by the operator until the end-effector of the manipulator is at the desired position and orientation. The human interface for this type of operator control can be in the form of a switch and/or a joystick that facilitates drive direction and speed by operator movement, where the movement commands of the joints and manipulator control is achieved by a communication link between the human interface and the manipulator. This type of positioning of the end-effector by step-by-step or successive positioning of joints is typically used for small ground robotic manipulators such as TALON robotics available from Foster-Miller Inc. (Massachusetts, USA) or PackBot robotics available from iRobot Corporation (Delaware, USA). Robotic control in this manner is limited in that it can take a considerable amount of time for the end-effector to achieve its desired position. In addition, this type of positioning of the end-effector may not provide adequate accuracy for positioning the end-effector and also does not permit arbitrary trajectories of motion to be achieved.

Another method for providing remote manipulator control involves an exoskeleton system provided on an operator's arm, where the exoskeleton system includes sensors that measure the joint angles to determine movement of the operator's arm. The measured joint angles are communicated to the manipulator via a communication link, and a local manipulator controller then positions the joints of the manipulator to match the corresponding joint angles of the operator. This type of manipulator control is limited in that it is only applicable to humanoid manipulators (e.g., manipulators that closely resemble and have the same joints as a human arm) and the mimic control is absolute. In other words, this type of control does not provide enhanced control by relative movement instructions from any operator arm or other limb orientation.

Thus, the previously described manipulator control mechanisms provide low-level control in which individual joint positions of the manipulator are individually controlled. It would be desirable to provide a manipulator control system that provides high-level control in which the end-effector position and orientation is directly controlled instead of the focus being on direct control of individual joint positions.

In addition, it is desirable to precisely monitor and control full position and orientation of the user's movements in six degrees of freedom (6 DoF) (i.e., monitoring position changes in three dimensions along x, y and z axes as well as orientation changes of yaw, pitch and roll or rotational movements along the x, y and z axes) so as to effect precise position and orientation control of a robotic manipulator or in a virtual reality scenario operated by a computer or other processing system.

Devices known in the art which are used to provide both position and orientation data so as to achieve 6 DoF data are complex and typically require the use of multiple sensors for the device along with external observation sensors in order to achieve reliable position and orientation data. While orientation tracker sensors do currently exist that provide real-time output of orientation changes, these sensors typically determine position changes by measuring acceleration forces which are integrated to determine instantaneous velocity values which are then used to determine displacement or position changes relative to a starting position. Determining position changes via accelerometer force data integration calculations leads to inaccuracies because of the noise associated with such calculations. This is why typical position monitoring and control devices must employ additional, external tracking sensors (such as video, ultrasound, magnetic field and/or other sensing equipment) to achieve reliable information about changes in position.

It is desirable to provide a position and orientation tracking system that is simple in design and is further reliable in tracking a full range of motions or gestures by a human so as to generate 6 DoF tracking information for achieving a desired movement or other control for a robotic manipulator or a computer or other processing system.

SUMMARY

In accordance with an example embodiment of the present invention, a human gesture tracking system comprises a sensor device including at least one sensor unit, where each sensor unit is configured to measure at least one of position in three dimensions of a portion of an operator's limb and orientation in three dimensions of the portion of the operator's limb. The system further comprises a processor configured to receive information from the sensor device so as to determine orientation and position displacement in six degrees of freedom of the operator's limb, and an activator that is coupled to communicate with the processor and is further actuated by the operator to designate a start time and an end time in which position and orientation displacements of the portion of the operator's limb are determined by the processor. During system operation, the processor determines position and orientation displacements of the portion of the operator's limb in tracking sessions, each tracking session is defined as a time period between the start time and the end time as designated by the activator. The processor further determines an initial position and orientation of the portion of the operator's limb at the start time of each tracking session and determines position and orientation displacements of the portion of the operator's limb during each tracking session in relation to the initial position and orientation for the tracking session.

In accordance with another example embodiment of the present invention, a method of tracking and mimicking human gestures using a human gesture tracking system comprises the following steps: (a) actuating an activator of the system to designate a start time of a tracking session; (b) measuring, via a sensor device of the system, initial information comprising at least one of position in three dimensions of a portion of an operator's limb and orientation in three dimensions of the portion of the operator's limb at the start time of the tracking session; (c) providing the measured information of step (b) from the sensor device to the processor of the system; (d) determining, via the processor of the system, an initial position and orientation of a portion of the operator's limb at the start time of the tracking session from the measured information provided in step (c); (e) measuring, via the sensor device, current information of at least one of position in three dimensions of the portion of the operator's limb and orientation in three dimensions of the portion of the operator's limb during the tracking session; (f) providing the measured information of step (e) from the sensor device to the processor of the system; (g) determining, via the processor of the system, a current position and orientation of the portion of the operator's limb from the measured information provided in step (f); (h) determining, via the processor of the system, position and orientation displacement information of the portion of the operator's limb based upon a change from initial position and orientation of the operator's limb as determined in step (d) to a current position and orientation of the operator's limb as determined in step (g); (i) providing the position and orientation displacement information determined in step (h) to a second system that facilitates control of the second system based upon the position and orientation displacement information; and (j) repeating steps (e)-(i) until the activator of the system is actuated to designate an end time of the tracking session.

The human gesture tracking system can be used in combination with a robotic manipulator device to effect corresponding or mimicking movements of an end-effector of the robotic manipulator device. The human gesture tracking system can also be used as a peripheral device for a computer system, where the human gesture tracking system provides position and orientation displacement information relating to the operator's limb movements to the computer system for controlling the operation of a computer software program of the computer system (e.g., a virtual reality gaming scenario, a computer training session or any other computer software program that requires user input data via a peripheral device of the computer).

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

Figure 1:
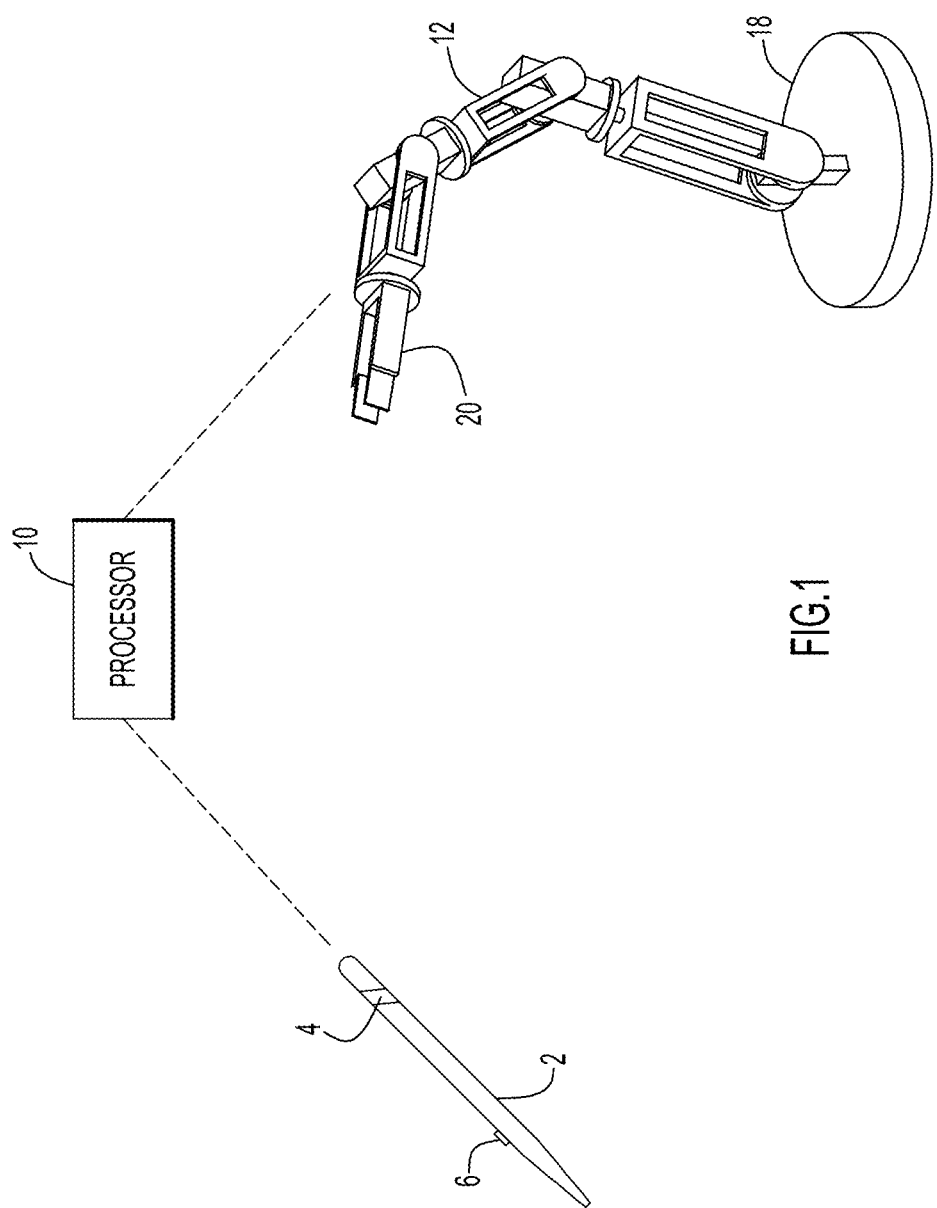
FIG. 1 schematically depicts an example embodiment of a manipulation control system including a hand-held rod that controls a robotic manipulator.

In accordance with the present invention, systems and corresponding methods are provided for providing manipulation control based upon mimic of human movements or gestures that are relatively simple in design and that provide efficient and accurate relative position and orientation information in relation to a user's movements (such as gestures made by a user's limb). In certain example embodiments, the manipulation control can be robotic manipulator control that directly controls a manipulator's end-effector position and orientation using natural human gestures (such as hand or foot gestures) and therefore facilitates control that requires minimal training and more efficient and accurate end-effector positioning and control. In other example embodiments, the manipulation control can be in relation to virtual reality environments or other software applications in which mimic of human movements can be translated within a virtual reality scenario controlled by a computer or processing system (e.g., translation of human movements into corresponding artificial movement within a computer game, training simulation or other types of software applications).

The systems and corresponding methods of the invention provide direct control of the position and orientation of an end-effector (or control within a virtual reality simulation or other software-related environment) using relative human gestures that are natural to the operator, such as multiple relative gestures in which an operator positions and re-positions his or her limb. The human gestures can also be scaled appropriately to achieve very fine, precise motion in certain applications (e.g., utilizing very small manipulator devices) or exaggerated motions (e.g., for applications utilizing very large manipulator devices).

In accordance with an embodiment of the invention, a human gesture tracking system includes a human interface component, a communication link component, and a manipulator component with an end-effector.

The human interface component can be any device including a sensor device comprising one or more sensor units, where the sensor device is capable of calculating and outputting, in real-time, relative position and orientation changes of a limb or a portion of the limb of the user that occur during a period from a first or initial orientation and position to a second or final orientation and position. For example, the human interface component can be configured to measure changes or offsets in three dimensional space and/or orientation (e.g., measuring up to six degrees of freedom) of an operator's hand from a first or initial position to a second or final position. Alternatively, the human interface component can also be configured to measure three dimensional position and/or orientation changes of the operator's foot or other limb portion of the operator. The term "six degrees of freedom" or "6 DoF" in relation to the measurements obtained by the sensor device refers to position measurements in three dimensions or with respect to x, y and z axes of a Cartesian coordinate system and also orientation measurements or rotations about the x, y and z axes (referred to as yaw, pitch and roll), thus providing three dimensional position and three dimensional orientation measurements.

The human interface component includes an activator (e.g., in the form of a switch or other mechanism) that is controllable by the operator to signal the start and stop of position/orientation or "gesture" measurements to be measured by the human interface component.

The robotic manipulator component or device can be of any suitable geometric design and configuration, optionally including any suitable number of links and joints connecting the links to form the component, where the robotic manipulator component is configured to control the position and orientation of an end-effector disposed at a distal end of the manipulator component directly and in real-time through a controller of the robotic manipulator component.

The communication link component receives from the human interface component information relating to any and all changes or offsets of position and orientation of the operator's limb that occur over the time period between the "start gesture" and "stop gesture" and transmits such information to the local controller of the manipulator component. The local controller of the manipulator component controls the kinematic model coordinate system of the end-effector in relation to a predefined base or other reference point of the manipulator component so as to effect positional and orientation movements of the end-effector from its original or starting position to a final position and orientation that correspond with the position and orientation displacement information measured by the human interface component. In other words, movement of the end-effector of the manipulator component mimics the movement of the operator's limb in real time based upon the measured position and orientation displacement data that is sampled by the human interface component over the time period between the "start gesture" and "stop gesture" signals (which are controlled by the activator of the human interface component). The human interface component can sample position and orientation offset data corresponding with the movement of the operator's limb at any suitable time intervals within the time period between the "start gesture" and "stop gesture" and continuously provide such position and orientation offset data, via the communication link, to the local processor or controller of the manipulator component so as to achieve the same or similar "mimic" movements by the end-effector in real time that correspond with movements of the operator's limb.

In this system, the human interface component and the robotic manipulator component are only coupled through the communication link, and there is no requirement for matching joints or other sections of the human interface component with the manipulator component. Thus, any human interface component can be used to control any manipulator system, such as a hand-held wand or rod or a system that attaches to portions of an operator's limb as described in detail below. This allows for relative movements of the human interface component to effect controlled movements of the manipulator component's end-effector. The operation of the three system components are generally described as follows.

The human interface component of the human gesture tracking system includes a sensor mechanism or device comprising one or more sensor units and an activator (e.g., in the form of a button that acts as a switch) that provides a start/stop signal mechanism to allow the operator to control "start gesture" and "stop gesture" times in which motion of the sensor device (which is tracking the human gesture) is to be monitored in order to achieve a mimic by the manipulator component's end-effector. The human interface component further includes a processor that calculates the operator's limb position and orientation (e.g., position and orientation of the operator's hand) offsets or displacements relative to the starting position and orientation so as to effectively capture the human gesture. The position and/or orientation offsets or displacements can be scaled by any desired factor by the processor.

The communication link component receives "start gesture" and "stop gesture" signals and also position and orientation offset or displacement data from the human interface component and provides such signals to the robotic manipulator component (e.g., to the processor or controller of the manipulator component). The communication link can include any suitable structure to provide one or more different types of wireless signals (e.g., infrared and/or radio frequency signals) or signals conveyed over hardwired connections between the human interface component and the robotic manipulator component.

Upon receiving a "start gesture" signal, the robotic manipulator component translates and rotates its kinematic model coordinate system so that the position and orientation of the end-effector at such "start gesture" time period is reset to a "zero" or initial, starting position within its coordinate system. The robotic manipulator component receives the position and orientation offset data in real time and via the communication link from the processor of the human manipulator component and moves its end-effector in accordance with such position and orientation offset data such that the end-effector mimics the movements of the operator's limb. The generation and transfer of the position and orientation offset data from the human interface component to the robotic manipulator component and corresponding real time movement of the end-effector of the robotic manipulator component continues until the "stop gesture" signal is generated by the human interface component.

While the system described above includes a processor as part of the human interface component, it is noted that, alternatively (or in combination with the human interface component including a processor), the processor or controller of the robotic manipulator component can directly receive the measured position and orientation information from the sensor device (which can include one or more sensor units) of the human interface component and perform calculations to determine position and orientation offset or displacement information for movement of the end-effector of the manipulator. In addition, the human interface component can optionally include a processor that is separate from and communicates with the sensor device via the communication link.

An example embodiment of a system of the present invention is depicted in FIG. 1. In this embodiment, the human interface component comprises an elongated wand or rod 2 that is configured to be held in an operator's hand so as to track movements of the operator's hand (which results in mimic movements of the end-effector of a robotic manipulator component or device). The rod includes an inertial tracking sensor unit 4 secured to the rod, where the sensor unit 4 includes at least one sensor (preferably a number of sensors) and is configured to measure changes in movement and orientation in three dimensions. The sensor tracking mechanism can use Micro-Electro-Mechanical Systems (MEMS) technology (including gyroscope sensors, accelerometer sensors and/or magnetometer sensors) to measure acceleration of the rod 2 in three dimensions (i.e., along x, y and z axes of a Cartesian coordinate system) as well as orientation of the rod along the three dimensions (i.e., yaw, pitch and roll with respect to the x, y and z axes), and this can be used to determine position and orientation displacement of the rod so as to determine up to six degrees of freedom (6 DoF) of movement for the operator's hand (which holds the rod). A non-limiting example embodiment of a type of sensor unit that can be used to measure such acceleration and orientation information is a MEMS sensor tracking device commercially available from InterSense, Inc. (Massachusetts, USA) under the tradename InertiaCube. However, other sensor units are also available and known in the art for use with the present invention, where such sensor units provide position information in three dimensions and/or orientation information in three dimensions.

The rod 2 further includes an activator or button 6 that is pressed or activated by the operator to signal the "start gesture" and "stop gesture" at which position and orientation data is measured, processed to determine position and orientation displacements and offsets, and transmitted to a manipulator component 12. For example, the button 6 can be in the form of a switch that closes a circuit to implement recording of sensor data from sensor unit for processing and for transmitting of the processed data to the robotic manipulator component 12.

The robotic manipulator component 12 is in the form of a robotic arm which includes a number of rigid sections connected to each other via a series of joints, with a base section 18 and an end-effector 20 being disposed at the ends between the other rigid sections and joints. The robotic manipulator component can include any suitable configuration, including any selected number of rigid sections and joints that facilitate rotation of the rigid sections with respect to such joints so as to achieve different positions and orientations of the end-effector in relation to the base (or other reference point) during operation of the manipulator component. Thus, the invention is not limited to robotic control with an example robotic manipulator as shown in the figures but instead can be adapted for any form or type of robotic control in which an end-effector or tool is moved with respect to a base or other reference point of the robotic manipulator.

Each robotic manipulator component having a different configuration includes its own kinematic model coordinate system that is configured for establishing precise movements between the end-effector and the base or other reference point of the robotic manipulator component based upon a stream of manipulator control data provided to the manipulator component.

A processor 10 is shown schematically in FIG. 1, with dashed lines representing communication links (e.g., wireless communication links) between the processor 10, the rod 2 and the manipulator component 12. The processor 10 can include one or more processing units and can optionally be provided as part of the sensor unit 4, as a separate, stand-alone unit, and/or as part of the robotic manipulator component 12. The processor receives the measured position and orientation data from the sensor unit 4, determines the position and orientation displacement data that is in a format which can be used by the manipulator component 12 for moving its end-effector 20 based upon its kinematic model coordinate system, and provides the position and orientation offset or displacement information to the manipulator component 12. The processor establishes tracking sessions, in which position and orientation displacement information is obtained for the operator's hand between "start gesture" and "stop gesture" commands by the activator.

Operation of the system to achieve a manipulation control of the end-effector 20 to mimic gestures of an operator's hand which holds rod 2 is now described. The operator signals the "start gesture" (e.g., by pressing and then releasing the button 6 or by pressing and holding the button 6 on the rod 2) such that remote motion control is activated or "turned on" and the current position and orientation of the operator's hand (which is holding the rod 2) is instantaneously synchronized with the current position and orientation of the manipulator's end-effector 20. In particular, the processor establishes an initial or start position and orientation of the operator's hand based upon the sensor data obtained at the start of each tracking session (i.e., when the "start gesture" signal or command is actuated by the operator pressing button 6). The manipulator component has an existing kinematic model coordinate system that has been specifically designed for effecting movement of the end-effector relative to the base 18.

When a "start gesture" is activated by the operator, the orientation of the rod 2 is calibrated to be in the same forward axis in which movement is to occur for the robotic manipulator. In addition, the kinematic model coordinate system is further calibrated so that the current position of the end-effector 20 (e.g., the position of the end-effector 20 with respect to the base 18) is set to "zero" or an initial starting point within the kinematic model coordinate system. When the "stop gesture" is activated (e.g., by releasing the button or pressing the button 6 a second time on the rod 2), the tracking session has ended and motion control between the human interface component and the robotic manipulator is released or deactivated. A new tracking session can be implemented when the operator initiates a "start gesture" command to the processor.

The relative position and orientation changes of the operator's hand (which is holding the rod 2) that are measured by the sensor unit 4 during the time period between the "start gesture" and "stop gesture" signals (which are determined by user control of button 6 on the rod 2) are transmitted to processor 10, and the processor converts this data into information that is used by the controller of the manipulator component to correspondingly adjust the position and orientation of the end-effector in relation to a reference or base point (e.g., a location at the base 18) of the manipulator 12 using the kinematic model coordinate system of the manipulator. In particular, the processor 10 receives position and orientation data from sensor unit 4 in selected time intervals (e.g., in microseconds, milliseconds, etc.) and determines a change or displacement of the operator's hand in 6 DoF of movement (i.e., three dimensions of position movement and three dimensions of orientation movement) based upon the current position and orientation data received from the sensor unit in relation to the initial position and orientation data (i.e., the position and orientation data received from the sensor unit at the "start gesture" time period). The offset or displacement position and orientation data is continuously provided by the processor 10 to the controller of robotic manipulator component 12 (via the wireless link) in a suitable format that allows the robotic manipulator component to determine a position and orientation displacement for moving the end-effector 20 with respect to the base 18 such that the end-effector tracks or mimics the movement of the operator's hand gestures during the tracking session.

Operation of the system in this manner allows the operator to freely move his or her hand to a suitable position and orientation prior to activating the button 6 on the rod 2 to synchronize with the end-effector 20. The operator can perform a series of short measured movements (i.e., movements between "start gesture" and "stop gesture") that are mimicked by the end-effector 20 so as to achieve a precise alignment and orientation of the end effector 20. Thus, the operator can use his or her own visual and haptic feedback for precise positioning of the end-effector 20 by movement of the operator's hand between tracking sessions and during tracking sessions.

Depending upon the speed of the manipulator 12, the operator can choose to move the rod 2 quickly, release the motion control (i.e., by activating a "stop gesture" signal), and then wait for the full motion trajectory of the end-effector 20 to occur. Alternatively, the operator can perform slower movements to stay in real-time with the corresponding tracking or mimic motion of the end-effector 20. In addition, the measured motions of the operator using the rod can be scaled for a particular application, in which the motion scaling can be adjusted with a selected gain factor to result in very large or exaggerated motions by the end-effector 20 in relation to the operator's hand gestures. The motion scaling can also be adjusted with a selected reduction factor to effect smaller, precise motions by the end-effector 20 in relation to the operator's hand gestures.

It is preferable that the system is operated in a manner where human gestures of short duration are tracked and measured in the manner described above, since gestures of short duration (e.g., about 5 seconds or less) for the wand or rod result in more precise and accurate translation of mimicking movements for the manipulator component. In particular, while certain sensor units utilizing MEMS technology can continuously output accurate relative orientation displacement information for a particular device to which they are coupled, relative position displacement information can be less accurate depending upon the duration of time with which the continuous data is measured. Accelerometers of the sensor unit measure acceleration forces due to the displacement of the sensor unit, and these acceleration forces are integrated to determine velocity values which are then used to determine position displacement in three dimensions (i.e., along x, y and z axes). These acceleration integration calculations to determine position displacement based upon the measured acceleration forces can lead to errors after a short period of time due to noise associated with such calculations. It is noted, however, that gestures of longer duration can also provide effective input to the system so long as the sensors and methods used to track the relative position displacement remain accurate for the duration of the gesture.

The system of the present invention allows an operator to minimize errors in the calculated position displacement data by operating the system utilizing short "start gesture" and "stop gesture" time periods while further utilizing the operator's own visual feedback regarding how the end-effector of the robotic manipulator has responded to the operator's limb motion so that the operator can then recalibrate the relative positioning of the end-effector as necessary (e.g., by re-positioning the limb of the operator prior to a "start gesture" and/or modifying the trajectory or path of movement of a particular gesture) in order to ensure the desired position and orientation of the end-effector is achieved. This results in a relative gesture and mimic control that is a more natural form of human control. Performing multiple, relative gestures is simpler and more closely resembles the manner by which humans typically operate in precise placement and orientation of objects.

Thus, the system of the present invention can be utilized to provide manipulation control of a robotic device by measuring movements of an operator's limb in up to 6 DoF (i.e., position displacements along the x, y and z axes of a three-dimensional Cartesian coordinate system as well as orientation displacements of yaw, pitch and roll along such axes) utilizing a single sensor unit and an activation button or device that controls the beginning and end of the gesture to which position and orientation data is to be recorded and processed for controlling the robotic device. In addition, the control data can be scaled by the processor with an adjustment or reduction factor prior to output to the robotic device so as to achieve larger or more exaggerated robotic movements or, alternatively, smaller and more precise robotic movements depending upon a particular application.

Figure 2:
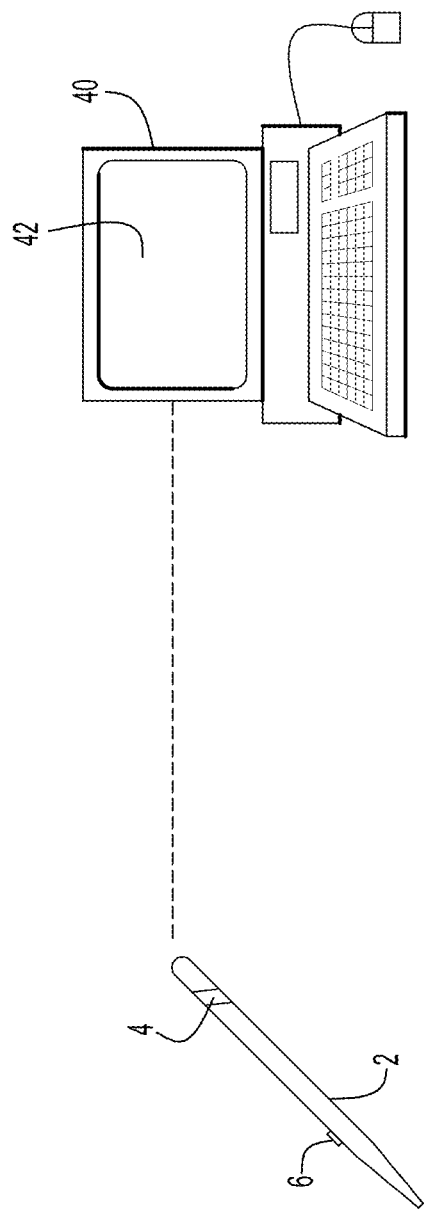
FIG. 2 schematically depicts an example embodiment of a manipulation control system including the hand-held rod of FIG. 1 in combination with a computer to effect control of a software program operated by the computer.

The rod 2 of FIG. 1 can also be implemented for use as a peripheral device (such as a three-dimensional mouse or joystick) for a computer 40 as shown in FIG. 2. In particular, the position and orientation displacement data can be determined for hand movements of the user and transmitted to computer 40 (e.g., via a wireless or hardwired link as generally indicated by the dashed line in FIG. 2). The transmitted data can be used by a processor of the computer 40 to control a software application (e.g., a software application stored within a data module of the computer) being processed and displayed on a digital display screen 42 associated with the computer 40. For example, hand movements of the operator holding rod 2 can be tracked and mimicked for controlling movements of a character or icon in a virtual reality scenario (e.g., a video game or training simulation) or other computer software program (e.g., a screen pointer for navigating and controlling features of a computer program) that is being generated by the computer processor and displayed on the display screen.

In addition, the system described above can also be designed for position control of the end-effector without orientation control. Further, due to the decoupling of the human interface system with the robotic manipulator and the fact that the measured relative movement of the operator is used to directly control the positioning and/or orientation of the end-effector of the manipulator, the system can be designed for use with any limb or body part of the operator, such as the operator's arm, hand, leg, foot or head, where relative movement of the operator's body part is mimicked by the end-effector of the manipulator.

Another example embodiment of the present invention utilizes a plurality of sensor units connected to an operator's limb to achieve precise manipulation control of a robotic device or in combination with a processor to control a software program based upon a mimic of human gestures. In this embodiment, a plurality of sensor units can be provided at various locations between the joints of the operator's limb in order to provide accurate and precise position tracking control data in up to 6 DoF. Similar to the previous embodiment, the system utilizing a plurality of sensor units is simple and unobtrusive in operation and requires no additional markers or other external hardware to achieve precise tracking of human gestures in 6 DoF.

Figure 3:
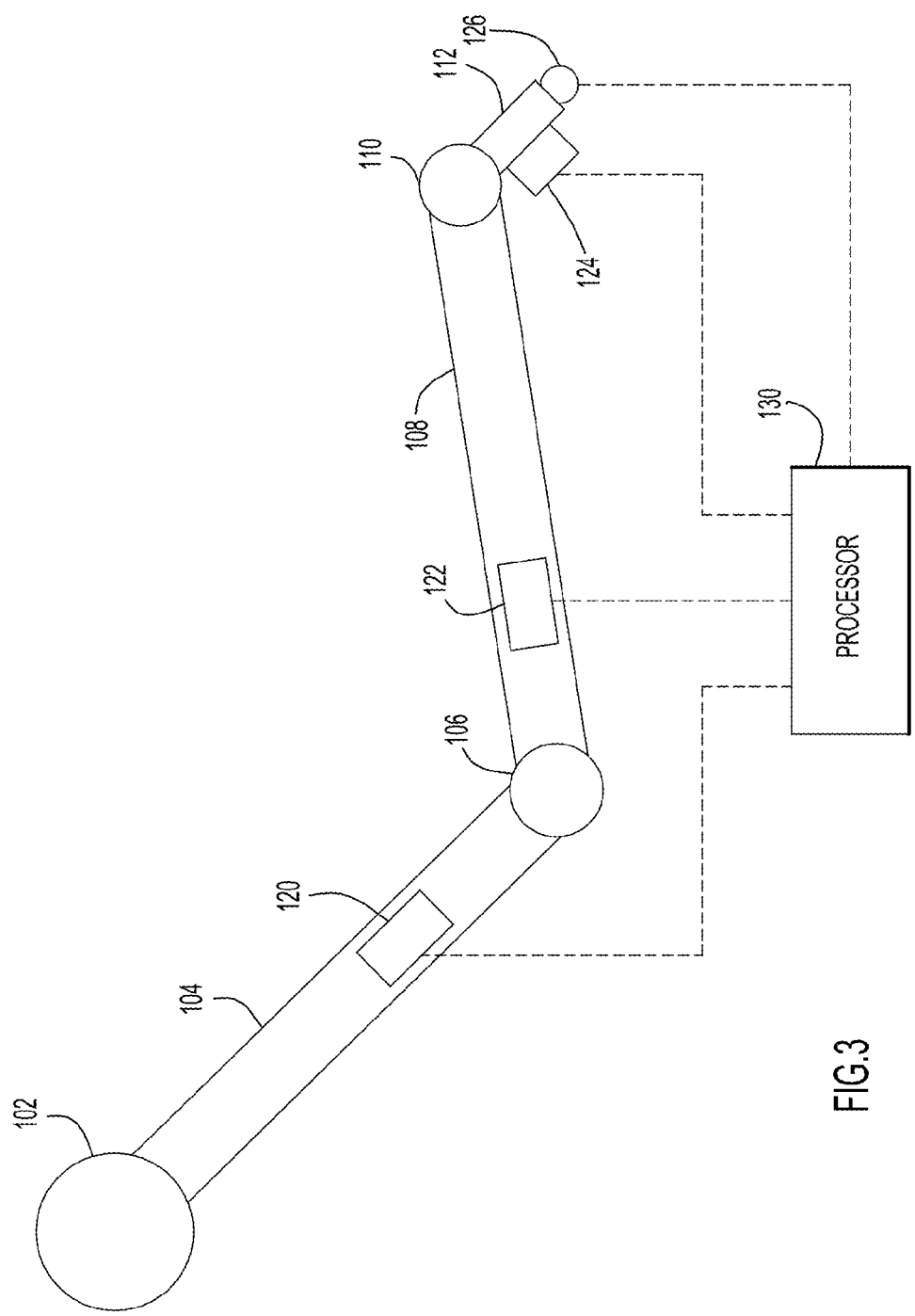
FIG. 3 schematically depicts an example embodiment of a manipulation control system including a plurality of sensors coupled to the arm of an operator.

Referring to FIG. 3, a system for achieving manipulator control of human gestures is schematically depicted as a structure which attaches to the operator's arm, where the operator's arm is defined by a shoulder section 102, upper arm section 104, elbow section 106, forearm section 108, wrist section 110 and hand section 112. Three orientation tracking sensor units 120, 122, 124 are provided to generate 6 DoF tracking data (i.e., position data in three dimensions and orientation or yaw, pitch and roll data in three dimensions) of the motion or displacement of hand section 112 relative to shoulder section 102. The sensor units can be of any suitable type that provides accurate orientation information for the sensor unit in three dimensions (i.e., yaw, pitch and roll displacement data). Example sensor units that can be used for this system include MEMS type sensors such as those described above in relation to the previous embodiment depicted in FIG. 1.

A first sensor unit 120 is secured in a selected orientation along the operator's upper arm section 104, the second sensor unit 122 is secured in a selected orientation along the operator's forearm section 108, and a third sensor unit 124 is secured to the operator's hand section 112. In addition, a hand-held activator or button 126 (in the form of a switch or other device), which can be held at the hand section 112 is used to activate the "start gesture" and "stop gesture" time periods in which tracking data is to be determined and provided to a processor 130. The sensor units and activator can be secured in any suitable manner to the operator's limb sections (such as via flexible straps or bands, via a brace or any other suitable structure). For example, the sensor units 120 and 122 can be connected to a rigid, hinged structure that fits around the operator's elbow section 106 or, alternatively, connected at their respective arm sections via straps or bands. Sensor unit 124 and activator 126 can be secured to a glove which is fit to the operator's hand section 112. Alternatively, sensor 124 and activator 126 can be provided on a wand or rod which is held by the hand of the operator (i.e., in a similar manner as the previous embodiment). It is preferable to orient sensors 120 and 122 with their yaw axes being aligned in order to ensure the accuracy of a calculation of position displacement of the hand section 112 relative to the shoulder section 102.

Each of the sensor units 120, 122, 124 and activator 126 are coupled via a communication link (e.g., wireless or hardwire link) with a processor 130 that receives the measured data from the sensor units and determines the position and orientation displacement data. The processor 130 performs real-time calculations during "start gesture" and "stop gesture" periods (as controlled by pressing the activator 126) based upon the input streams from the sensor units. The processor 130 further outputs 6 DoF control stream data to a robotic device or computer system to achieve manipulator control based upon the human gestures.

The calculations performed by the processor can be based solely upon the orientation data determined by the sensor units, such that no acceleration data of the sensor units is required by the processor to obtain position displacement information of the operator's hand section 112 relative to the shoulder section 102. The three dimensional position of the hand section 112 relative to the shoulder section 102 is determined by the processor upon having information regarding the measured lengths of the upper arm section 104, forearm section 108 and hand section 112, and these measured lengths can be input to the processor during set-up and prior to use of the system. The orientation displacement data provided by the three sensor units for each of the upper arm, forearm and hand sections combined with the known information of the lengths of these sections facilitate a calculation of positional offsets in three dimensions (i.e., along x, y and z axes) of the hand section 112 with respect to the shoulder section 102, while the orientation displacement data from sensor 124 at the hand section provides orientation displacement information (i.e., yaw, pitch and roll changes along the x, y and z axes).

The activator 126 facilitates relative robotic manipulator control in a manner similar to the previously described embodiment, in which tracking of hand movements by the operator and corresponding mimic control of the end-effector for a robotic manipulator component or device are performed in short "start gesture" and "stop gesture" time intervals. As noted above, this form of relative control corresponds with more natural positioning movements of humans, in which multiple, relative gestures are typically performed, with visual feedback utilized in between movements to obtain a precise positioning and orienting of a particular object. In addition, this type of control allows the operator to reposition his or her arm (or other limb) between tracking sessions to prepare for a new gesture with extended range and further accuracy.

Figure 4:
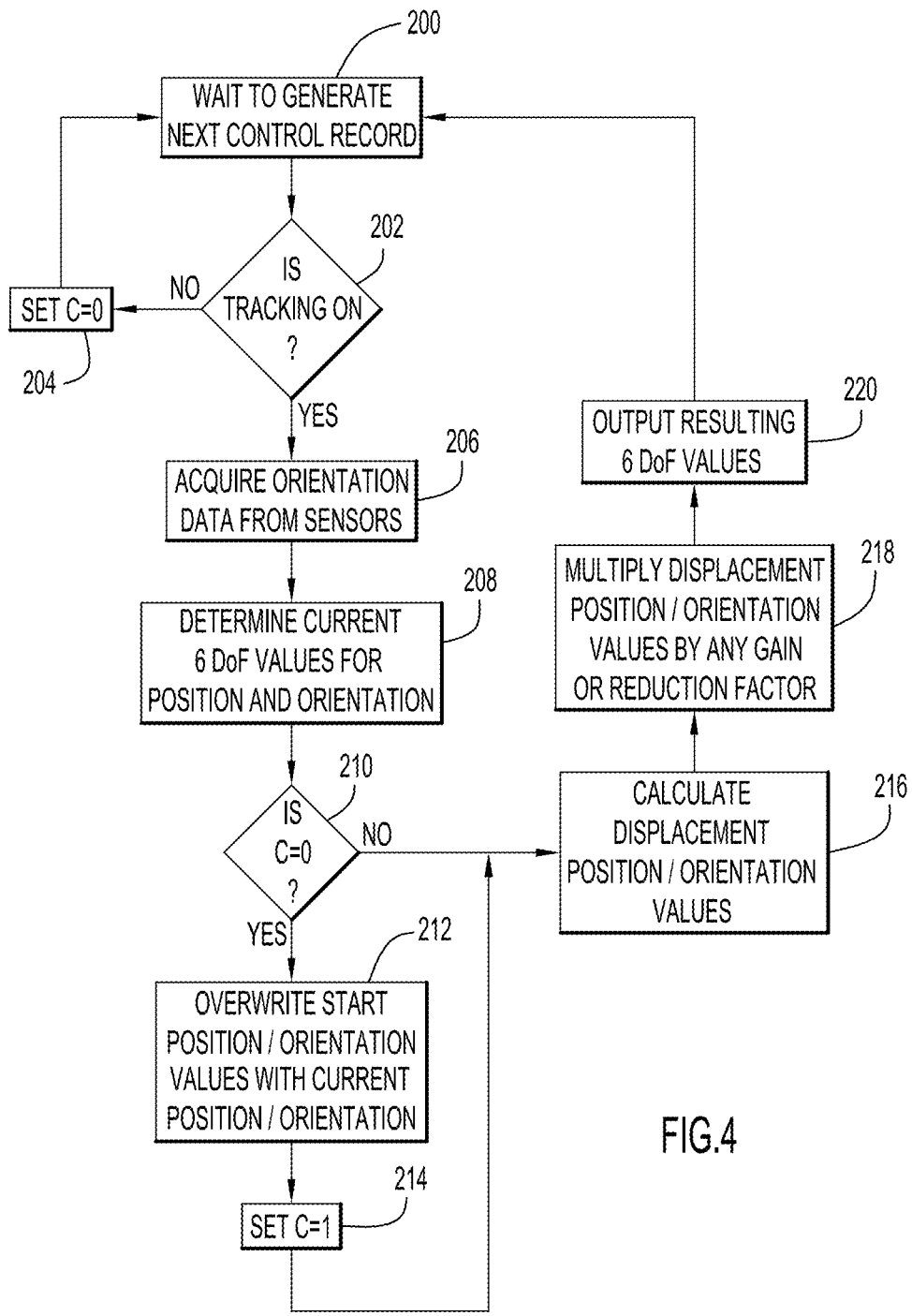
FIG. 4 is a flowchart showing process steps during operation of the manipulation control system of FIG. 3.

Operation of the system of FIG. 3, in which a tracking session is implemented to obtain 6 DoF output data for effecting manipulator control, is described with reference to the flowchart of FIG. 4. The first step (step 200) relates to a selected time period (e.g., on the order of seconds, milliseconds, microseconds, etc.) between when orientation data measured by sensors 120, 122, 124 is acquired to establish a control record via transmission from the sensors to the processor 130. In the next step (202), a determination is made regarding whether human gesture tracking is turned on. In other words, a determination is made as to whether the activator is engaged by the operator (i.e., a time period between the "start gesture" and "stop gesture" which is controlled by the operator via activator 126) to facilitate recording of hand gesture tracking by the system. If the operator has not activated a "start gesture" tracking session, a counter C is set to zero (step 204) and the process loops back to the initial step of waiting to generate a control record (step 200).

If tracking has been turned on (i.e., between a "start gesture" and "stop gesture" activation), the processor 130 acquires orientation data from sensors 120, 122, 124 (step 206). The processor 130 rotates the axes or vectors relating to tilt and roll as necessary so that the tilt and roll are relative to a level axis. This allows measurements from the different sensors to be combined in the same coordinate system in order to calculate position displacement and can be considered part of the position displacement calculation. Orientation sensors typically are able to produce tilt and roll measurements relative to level since gravity is such a strong (and thus easy) force to determine. In addition, the arm sensors 120, 122, and 124 are aligned such that the yaw values are relative to the same direction. This can be achieved, for example, through mechanical sensor integration into the apparatus and operator calibration (e.g. the operator extends his or her arm so that all limb/hand joints are aligned in a selected configuration, and then an operator activation event signals the processor to consider the current yaw readings of all sensors to indicate the same yaw). The system is further configured such that a forward direction of movement of the operator's arm corresponds with a forward direction of movement to be mimicked by a robotic manipulator component or within a virtual environment of a software program operated by a computer. From the orientation information acquired from the sensors, processor 130 determines the current 6 DoF values for position and orientation of the operator's hand section 112 relative to shoulder section 102 (step 208). The processor 130 calculates a current position offset distance (i.e., distance in three dimensions along x, y and z axes) between the hand section 112 and shoulder section 102 based upon the known lengths of upper arm section 104, forearm section 108 and hand section 112 (which have been previously input to the processor) and the orientation information provided from sensors 120, 122, 124 to processor 130. The current hand orientation information (i.e., rotation or yaw, pitch and roll orientations of the hand with respect to the x, y and z axes) is determined from the orientation information provided by sensor 124 located at the hand section 112.

The processor then determines whether a tracking session has just been initiated (i.e., a "start gesture" signal has just been actuated) by determining if the counter C=0 (step 210). If C=0 (indicating that a tracking session has just been initiated), a stored set of starting 6 DoF values (e.g., stored in a memory module associated the processor) relating to starting position and orientation of the operator's hand section 112 in relation to shoulder section 102 is overwritten with the current 6 DoF values calculated in step 208 (the overwrite step is indicated in FIG. 4 as step 212). The counter C is then set to 1 (step 214).

In the next step (step 216), position and orientation displacement values are calculated by subtracting the start position values from the current position values (in three dimensions or along the x, y and z axes) and subtracting the start orientation values from the current orientation values (in three dimensions to encompass yaw, pitch and roll changes of the hand section 112). If there is a gain or reduction factor to be applied to the calculated displacement position and orientation values obtained in the previous step, these values are multiplied by such gain or reduction factor (step 218).

The resulting 6 DoF displacement values are then output by the processor 130 to the controller or processor of a robotic manipulator or other computer system (step 220) in a suitable format that can be used by the robotic manipulator or computer system to mimic the hand movements of the operator. The process is then repeated (at step 200).

Thus, the system of FIG. 3 operates in a manner such that, when an operator initiates a hand gesture and turns the tracking session on (by activating activator 126 to designate a "start gesture" command), the 6 DoF output values will initially be set to zero and will not change unless and until the operator moves and/or changes the orientation of hand section 112 relative to shoulder section 102. When the tracking session is turned off (by activating or de-activating activator 126 to designate a "stop gesture" command), the human manipulator system is decoupled from the robotic manipulator or other computer controlled system, and the operator is then free to move hand section 112 between gestures (e.g., to align the hand section in a desired manner prior to engaging in the next gesture tracking session) without having such hand movements recorded by the system.

Figure 5:
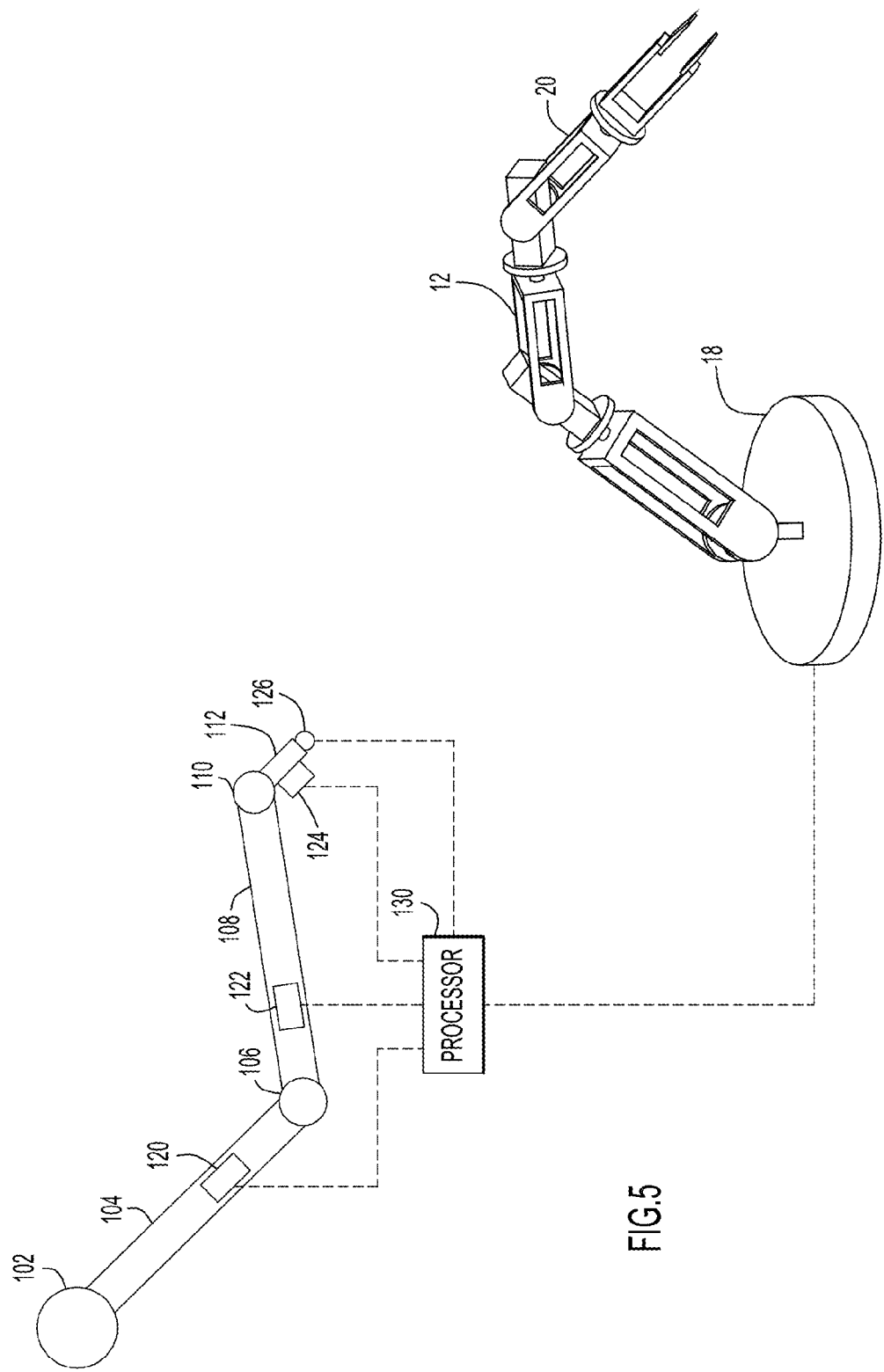
FIGS. 5 and 6 depict the manipulation control system of FIG. 3 in combination with a robotic manipulator that is controlled by the manipulation control system.
Figure 6:
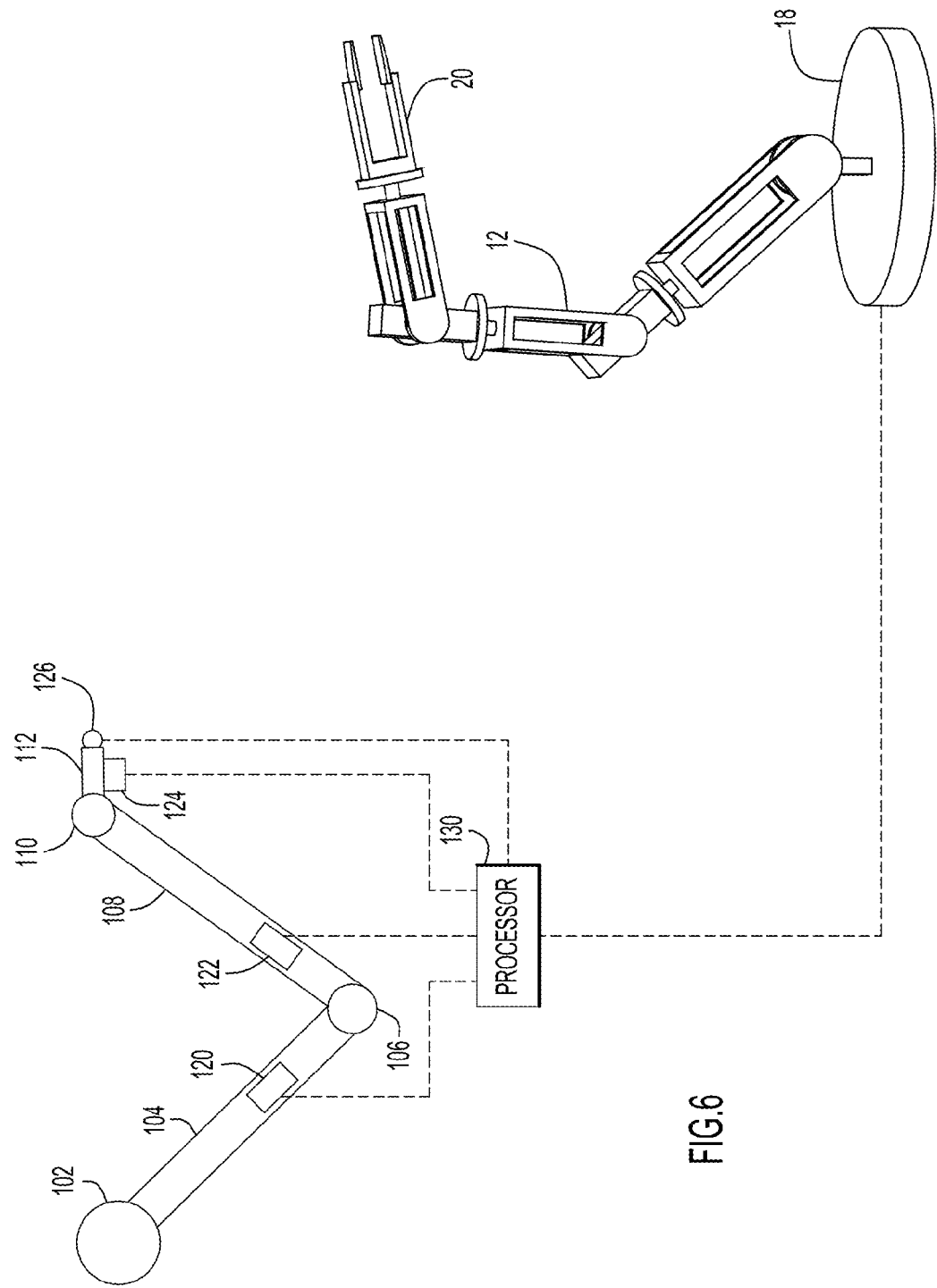

The system of FIG. 3 can be implemented for use with a robotic manipulator component 12 as shown in FIGS. 5 and 6, where position and orientation movements of the hand section 112 are conveyed to the end-effector 20 of the manipulator component 12 after being processed by processor 130. The processor 130 can be coupled with a controller of the robotic manipulator component 12 in any suitable manner (e.g., via one or more wireless and/or hardwired communication links) to facilitate transmission of relative 6 DoF position and orientation displacement information during a tracking session.

The robotic manipulator component uses the position and orientation displacement information in a manner similar to that described above for the embodiment of FIG. 1, where the end-effector 20 is moved relative to the base 18 in a manner that corresponds with or mimics movements of the hand section relative to the shoulder section of the operator. FIG. 5 represents a starting position of the human manipulator system in relation to a starting position of the robotic manipulator component 12, and FIG. 6 represents an ending position of the human manipulator system with a corresponding ending position of the robotic manipulator component as the result of a single tracking session (recorded between "start gesture" and "stop gesture" commands of the system). Position movements of end-effector 12 are in relation to a base 18 of the robotic manipulator component, and these position movements mimic or correspond with changes in position between the operator's hand section 112 and shoulder section 102 during the tracking session. The orientation changes of the end-effector 112 mimic or correspond with orientation changes of the hand section 112 during the tracking session.

As previously noted, the number of rigid sections and joints about which the rigid sections of the robotic manipulator component or device are rotatable do not need to match or identically correspond with the number of rigid sections and joints of the human manipulator component or system of the invention. This can be seen in the embodiment of FIG. 1 as well as the embodiment of FIGS. 5 and 6.

Figure 7:
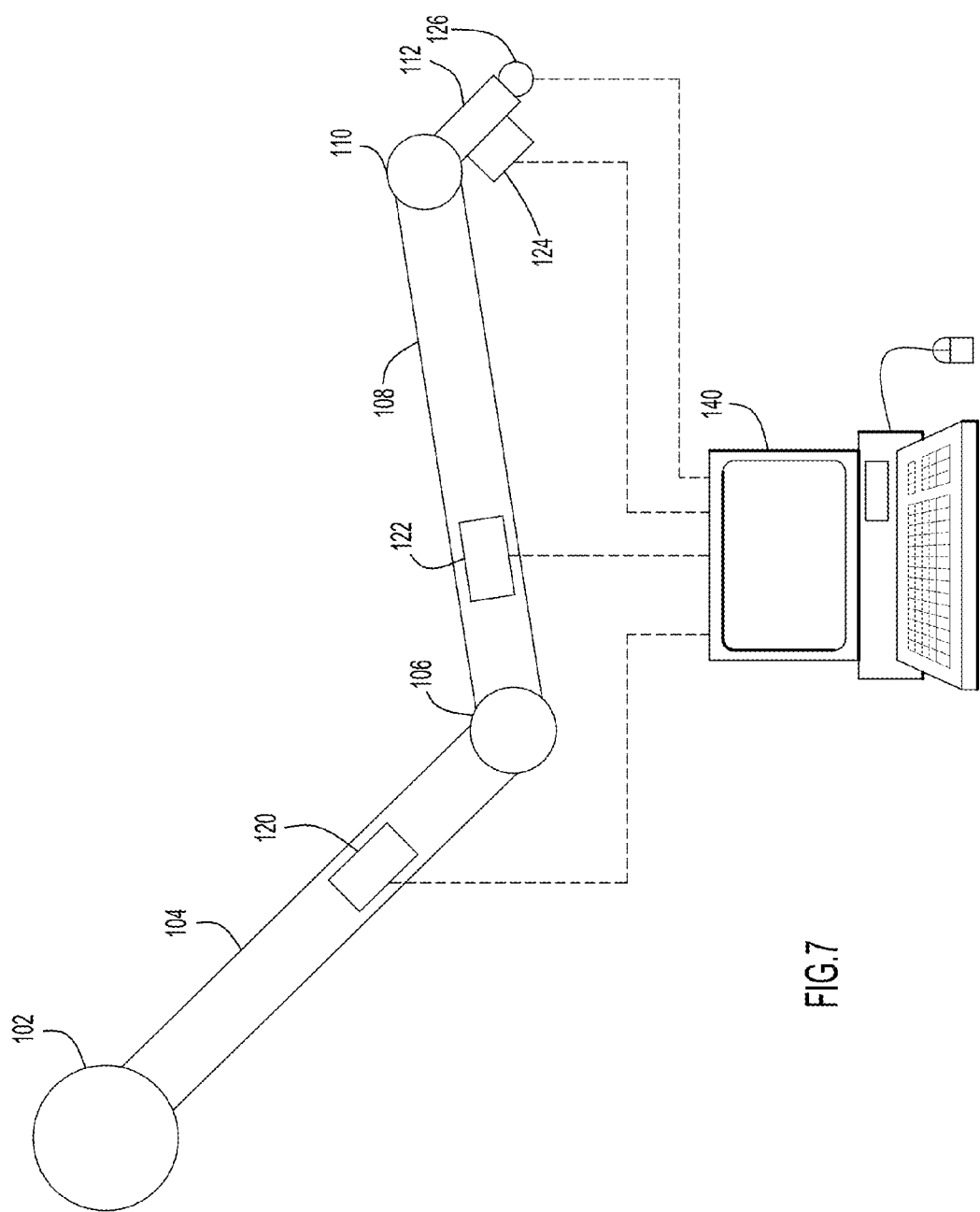
FIG. 7 depicts the manipulation control system of FIG. 3 in combination with a computer to effect control of a software program operated by the computer.

The system of FIG. 3 can also be implemented for use as a peripheral device for a computer system 140, as shown in FIG. 7. In particular, the position and orientation displacement data can be determined for hand movements of the user and transmitted to computer 40 (e.g., via a wireless or hardwired link as generally indicated by the dashed line in FIG. 4). The transmitted data can be used by a processor of the computer 40 to control a software application (e.g., a software application stored within a data module of the computer) being processed and displayed on a digital display screen 42 associated with the computer 40. For example, movements of hand section 112 relative to shoulder section 102 can be mimicked for controlling movements of a character or icon in a virtual reality scenario (e.g., a video game or training simulation) or other computer software program (e.g., a screen pointer for navigating and controlling features of a computer program) that is being generated by the computer processor and displayed on the display screen.

It will be appreciated that the embodiments described above and illustrated in the drawings represent only a few of the many ways of implementing a system and corresponding method for effectively providing manipulation control based upon mimic of human movements or gestures.

The system can utilize a single tracking sensor or a plurality of tracking sensors, where each tracking sensor is configured to track at least one of three-dimensional positioning of the sensor (i.e., position along x, y and z axes of a three-dimensional Cartesian coordinate system) and three-dimensional orientation of the sensor (i.e., yaw, pitch and roll along the x, y and z axes). Any suitable types of sensors can be used to provide such position and/or orientation information including, without limitation, MEMS type tracking sensors of the types described above.

Any suitable type or types of processors may be implemented that are coupled with the sensors and robotic manipulator controller or other computer system in any suitable manner (e.g., hardwired or wireless links) to facilitate transmission of the measured sensor data to the processor(s) for processing and/or transmission to the controller of the robotic manipulator. The processor(s) may include any quantity of any type of microprocessor, processing system or other circuitry to facilitate calculation and/or other processing of the sensor measured data to determine position and orientation displacement information to be output by the human gesture tracking system.

The present invention provides a number of advantages in relation to conventional robotic control systems including, without limitation, at least the following features: the systems of the invention utilize natural human gestures of a hand or other body part of the operator to achieve end-effector positioning and/or orientation; the systems allow for relative "gesture" control, which is a superior form of natural human control; and the systems are applicable to robotic manipulators having any number of varieties of different designs (i.e., not limited to manipulators that are modeled after a particular body part of the operator), since there is no requirement to "map" movable joints of the operator controlled system with the robotic system that is mimicking the human gestures.

The systems and corresponding methods of the present invention can provide direct control for any number of robotic applications, including applications in which a single operator simultaneously controls multiple robotic manipulators (i.e., multiple manipulators mimic the movements of the operator). The systems and corresponding methods of the present invention can be implemented for a variety of different applications including, without limitation: direct end-effector control of very large manipulator machines, such as heavy machinery for manufacturing, construction, mining or farming; direct end-effector control of very small manipulator devices for applications such as surgery, biological research, and very fine and precise fabrication; operation of manipulators in hazardous environments such as explosive ordinance disposal or first responder applications; tactical military, law enforcement and security robot applications; as navigational control systems for unmanned vehicles used in land, sea and air navigation.

In addition, the systems and corresponding methods of the present invention can be utilized as computer peripherals for inputting information to computer systems operating software programs installed and/or operating on storage modules of the computer systems. Examples of uses of the systems of the present invention as peripheral devices for computer systems include, without limitation: for computer aided design (CAD) software programs (i.e., using hand or foot gestures to provide input information which controls operation of a CAD program that is being run on a computer); and as input for controlling video gaming or other virtual reality scenarios being operated and controlled on a computer system (e.g., using hand or foot gestures to control a character or icon in a virtual reality gaming or training scenario which is being operated by a computer).

Having described example embodiments of systems and methods that effectively provide manipulation control based upon mimic of human movements or gestures, variations and changes will be suggested to those skilled in the art in view of the teachings set forth herein. It is therefore to be understood that all such variations, modifications and changes are believed to fall within the scope of the present invention as defined by the appended claims.

What is claimed:

1. A human gesture tracking system comprising:
a sensor device comprising at least one sensor unit configured to couple with an operator's limb, wherein each sensor unit is configured to measure at least one of position in three dimensions of a portion of the operator's limb and orientation in three dimensions of the portion of the operator's limb;
a processor configured to receive information from the sensor device so as to determine orientation and position displacement in six degrees of freedom of the operator's limb; and
an activator that is coupled to communicate with the processor and is further actuated by the operator to designate a start time and an end time in which position and orientation displacements of the portion of the operator's limb are determined by the processor;
wherein:
during system operation, the processor determines position and orientation displacements of the portion of the operator's limb in tracking sessions, each tracking session is defined as a time period between the start time and the end time as designated by the activator, the processor determines an initial position and orientation of the portion of the operator's limb at the start time of each tracking session and determines position and orientation displacements of the portion of the operator's limb during each tracking session in relation to the initial position and orientation for the tracking session; and
the system is configured such that each tracking session effects an occurrence of a translated movement within a second system prior to establishing a subsequent tracking session such that a gesture by the operator that is defined by movement of the operator's limb during each tracking session effects a corresponding mimic movement by a component of the second system.

2. The system of claim 1, wherein the portion of the operator's limb comprises the operator's hand, and the system further comprises:
a rod configured to be held by the operator's hand, wherein the rod includes the sensor device and the activator.

3. The system of claim 2, wherein the activator comprises a switch that is depressed by the operator during system operation to designate at least one of the start time and the end time.

4. The system of claim 2, wherein the sensor device comprises a single sensor unit that measures position information in three dimensions and orientation information in three dimensions of the operator's hand based upon manipulation of the rod by the operator's hand.

5. The system of claim 1, wherein the sensor device comprises a plurality of sensor units, and the processor utilizes orientation information in three dimensions measured by the sensor units to determine orientation and position displacement in six degrees of freedom of the operator's limb.

6. The system of claim 5, wherein the portion of the operator's limb comprises the operator's hand, and the sensor device includes a first sensor unit that is secured between a shoulder joint and an elbow joint of the operator's limb, a second sensor unit that is secured between the elbow joint and a wrist joint of the operator's limb, and a third sensor unit that is secured proximate the operator's hand.

7. The system of claim 6, further comprising:
a rod configured to be held by the operator's hand, wherein the rod includes the third sensor unit and the activator.

8. The system of claim 1, wherein the component of the second system comprises:
a robotic manipulator device including an end-effector that is controlled by the robotic manipulator device to be positioned in a plurality of positions and orientations in six degrees of freedom with respect to a reference location of the robotic manipulator device;
wherein the processor provides orientation and position displacement information of each tracking session to the robotic manipulator device to facilitate a corresponding position and orientation displacement of the end-effector with respect to the reference location of the robotic manipulator device such that the end-effector mimics a movement in real time of the portion of the operator's limb during each tracking session.

9. The system of claim 8, wherein the robotic manipulator includes a plurality of rigid sections and a plurality of joints connected with and about which corresponding rigid sections rotate to achieve a selected position and orientation alignment of the end-effector with respect to the reference location of the robotic manipulator device, the at least one sensor unit of the sensor device is secured to at least one rigid support member, and a number of rigid sections of the robotic manipulator differs from a number of rigid support members to which the at least one sensor unit is secured.

10. The system of claim 1, wherein the system is configured to connect as a peripheral to a computer system to facilitate transmission of orientation and position displacement information relating to movement of the operator's limb from the processor to the computer system so as to control operation of a software program operated by the computer system.

11. A method of tracking and mimicking human gestures using a human gesture tracking system, the method comprising:
(a) actuating an activator of the system to designate a start time of a tracking session;
(b) measuring, via a sensor device of the system that is coupled with an operator's limb, initial information comprising at least one of position in three dimensions of a portion of the operator's limb and orientation in three dimensions of the portion of the operator's limb at the start time of the tracking session;
(c) providing the measured information of step (b) from the sensor device to the processor of the system;
(d) determining, via the processor of the system, an initial position and orientation of a portion of the operator's limb at the start time of the tracking session from the measured information provided in step (c);
(e) measuring, via the sensor device, current information of at least one of position in three dimensions of the portion of the operator's limb and orientation in three dimensions of the portion of the operator's limb during the tracking session;
(f) providing the measured information of step (e) from the sensor device to the processor of the system;
(g) determining, via the processor of the system, a current position and orientation of the portion of the operator's limb from the measured information provided in step (f);
(h) determining, via the processor of the system, position and orientation displacement information of the portion of the operator's limb based upon a change from initial position and orientation of the operator's limb as determined in step (d) to a current position and orientation of the operator's limb as determined in step (g);
(i) providing the position and orientation displacement information determined in step (h) to a second system that facilitates control of the second system based upon the position and orientation displacement information; and
(j) repeating steps (e)-(i) until the activator of the system is actuated to designate an end time of the tracking session;
wherein each tracking session effects an occurrence of a translated movement within the second system prior to establishing a subsequent tracking session such that a gesture by the operator that is defined by movement of the operator's limb during each tracking session effects a corresponding mimic movement by a component of the second system.

12. The method of claim 11, further comprising:
(k) actuating the activator of the system to designate a start time of a second tracking session;
(l) measuring, via a sensor device of the system, initial information comprising at least one of position in three dimensions of a portion of an operator's limb and orientation in three dimensions of the portion of the operator's limb at the start time of the second tracking session;
(m) providing the measured information of step (l) from the sensor device to the processor of the system;
(n) determining, via the processor of the system, an initial position and orientation of a portion of the operator's limb at the start time of the second tracking session from the measured information provided in step (m);
(o) repeating steps (e)-(i) until the activator of the system is actuated to designate an end time of the second tracking session.

13. The method of claim 11, wherein a plurality of tracking sessions are generated according to steps (a)-(j), and initial position and orientation information is determined at the start time of each tracking session.

14. The method of claim 11, wherein the portion of the operator's limb comprises the operator's hand, the sensor device comprises a sensor unit connected with a rod that is held by the operator's hand.

15. The method of claim 14, wherein the activator comprises a switch connected with the rod, and the actuation of the switch in at least one of steps (a) and (j) comprises depressing the switch.

16. The method of claim 14, wherein the sensor device comprises a single sensor unit that, in steps (b) and (e), measures position information in three dimensions and orientation information in three dimensions of the operator's hand based upon manipulation of the rod by the operator's hand.

17. The method of claim 11, wherein the sensor device comprises a plurality of sensor units that, in steps (b) and (e), measure orientation information in three dimensions of the operator's limb, and the processor, in steps (d) and (g), determines position and orientation of the portion of the operator's limb based upon the orientation information provided by the sensor units.

18. The method of claim 17, wherein the portion of the operator's limb comprises the operator's hand, and the sensor device includes a first sensor unit that is secured between a shoulder joint and an elbow joint of the operator's limb, a second sensor unit that is secured between the elbow joint and a wrist joint of the operator's limb, and a third sensor unit that is secured proximate the operator's hand.

19. The method of claim 18, wherein the third sensor unit is secured to a rod configured that is held by the operator's hand.

20. The method of claim 11, wherein the second component of the second system comprises a robotic manipulator device including an end-effector, and step (i) further comprises:
   (i.1) controlling movement of the end-effector, via the position and orientation displacement information provided to the robotic manipulator device such that the end-effector moves in relation to a reference location of the robotic manipulator device such that the end-effector mimics a corresponding movement in real time of the operator's limb.

21. The method of claim 11, wherein the second system comprises a computer system, and the human gesture tracking system couples as a peripheral device for the computer system, and step (i) further comprises:
   (i.1) controlling operation of a software program operated by the computer system based upon the position and orientation displacement information provided to the computer system.

22. The system of claim 1, wherein position and orientation displacements of the portion of the operator's limb are determined only between the start time and the end time of the tracking sessions such that each tracking session is calibrated separately and independently from all other tracking sessions.

* * * * *